No. 750,545. PATENTED JAN. 26, 1904.
A. W. McL. KEEN.
RACE GAME.
APPLICATION FILED SEPT. 9, 1903.
NO MODEL. 4 SHEETS—SHEET 1.
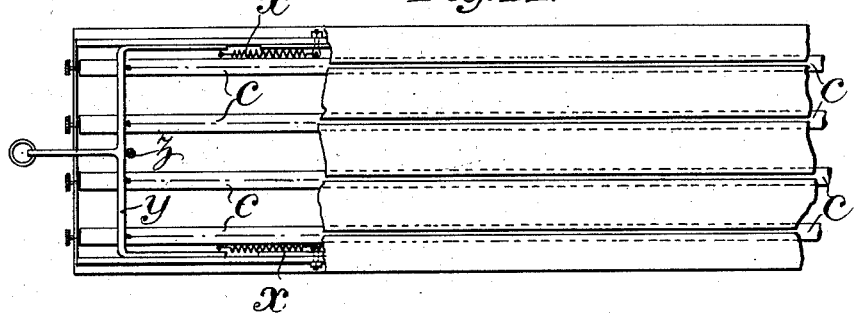
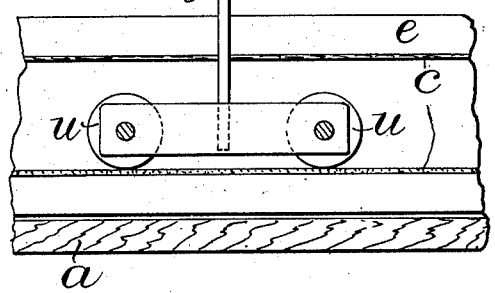
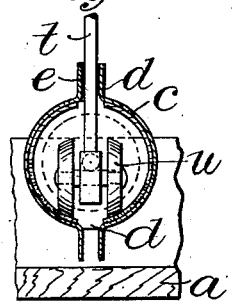
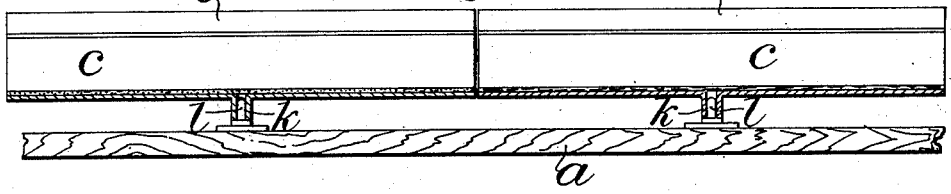
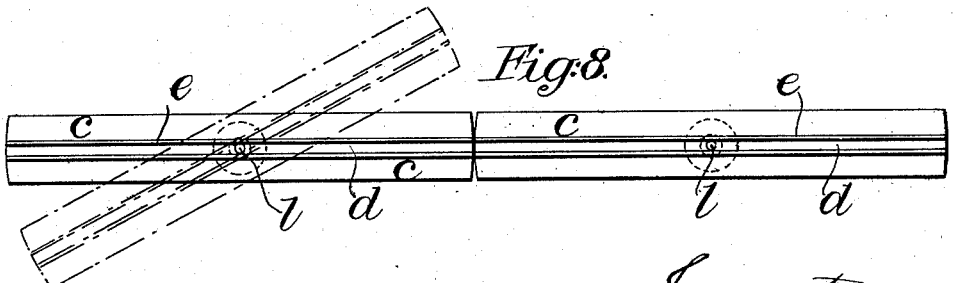

No. 750,545. PATENTED JAN. 26, 1904.
A. W. McL. KEEN.
RACE GAME.
APPLICATION FILED SEPT. 9, 1903.
NO MODEL. 4 SHEETS—SHEET 2.
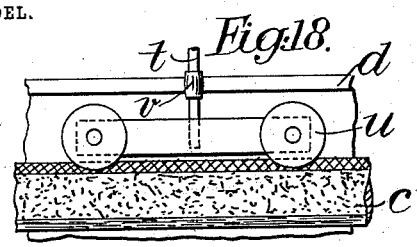
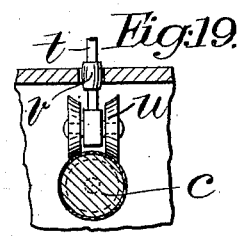
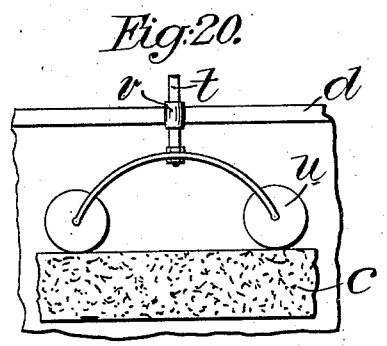
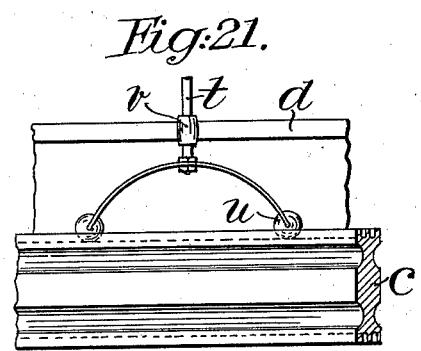
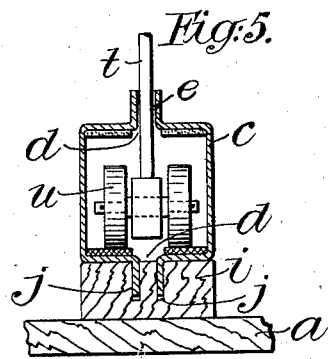
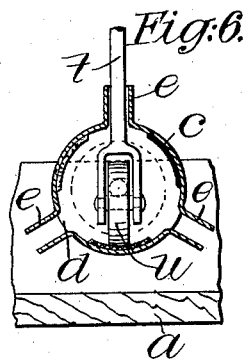
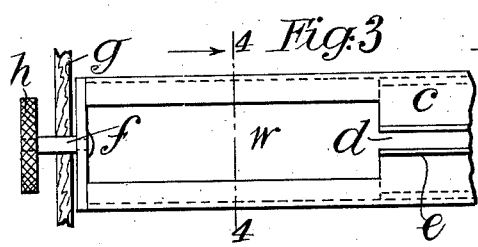
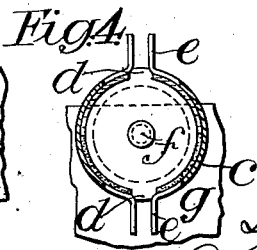

No. 750,545. PATENTED JAN. 26, 1904.
A. W. McL. KEEN.
RACE GAME.
APPLICATION FILED SEPT. 9, 1903.
NO MODEL. 4 SHEETS—SHEET 3.
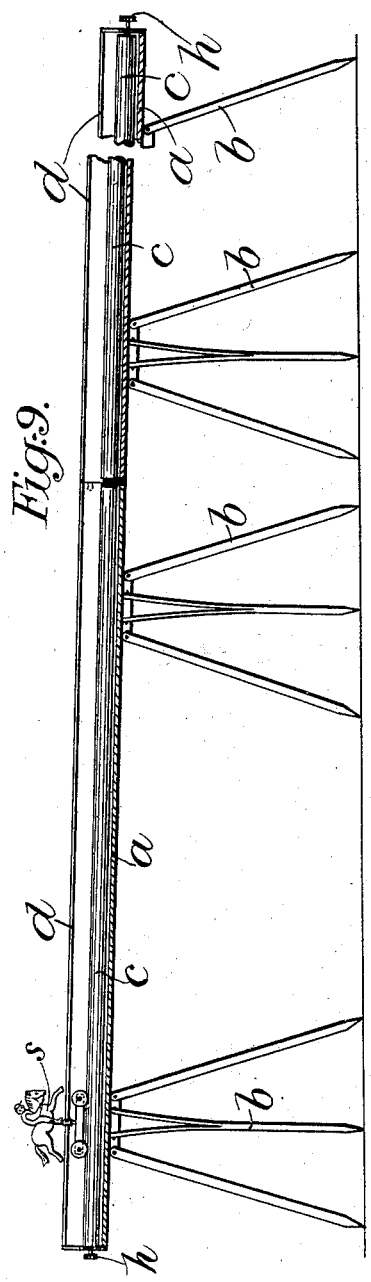
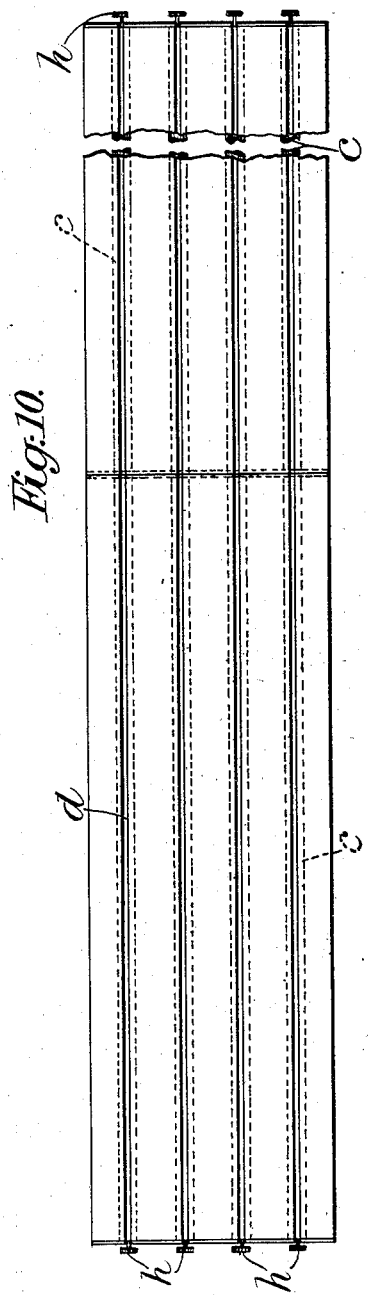

No. 750,545. PATENTED JAN. 26, 1904.
A. W. McL. KEEN.
RACE GAME.
APPLICATION FILED SEPT. 9, 1903.
NO MODEL. 4 SHEETS—SHEET 4.
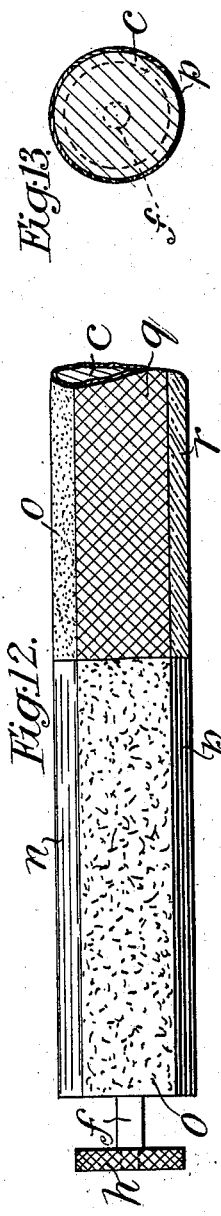
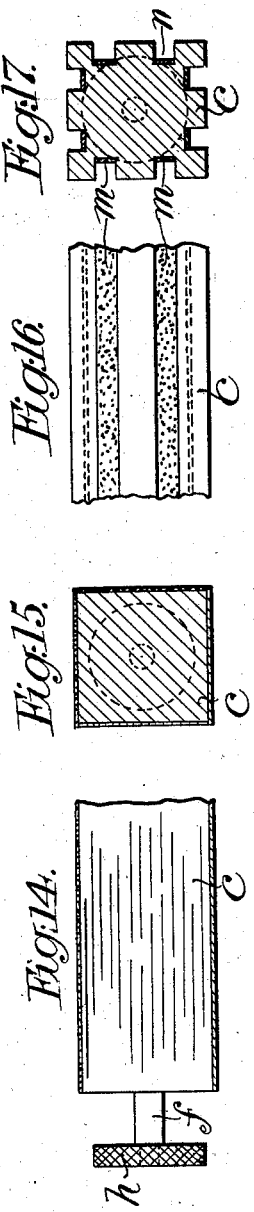
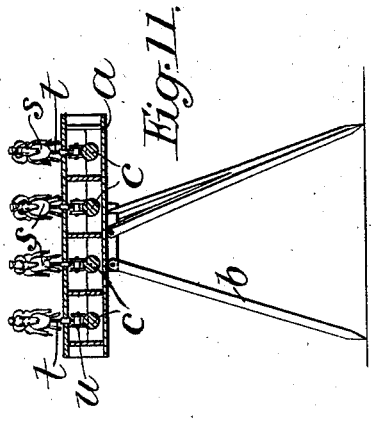

No. 750,545. Patented January 26, 1904.

UNITED STATES PATENT OFFICE.

ARTHUR W. McLEOD KEEN, OF LONDON, ENGLAND, ASSIGNOR OF TWO-THIRDS TO CHARLES STANLEY GARDNER AND ERNEST WATSON, OF LONDON, ENGLAND.

RACE GAME.

SPECIFICATION forming part of Letters Patent No. 750,545, dated January 26, 1904.

Application filed September 9, 1903. Serial No. 172,514. (No model.)

*To all whom it may concern:*

Be it known that I, ARTHUR WILLIAM MCLEOD KEEN, a subject of the King of Great Britain, residing at London, England, have invented certain new and useful Improvements in Race Games, of which the following is a full, clear, and exact description.

The object of the present invention is to construct a track for metal horses and other objects the character of which may be readily varied or changed, so that different horses or other objects may win each time.

The invention is illustrated in the accompanying drawings, in which—

Figure 1 is a cross-section, and Fig. 2 is a longitudinal section, of part of one form of tubular track. Fig. 3 is a plan of one end of said track, and Fig. 4 is a cross-section on the line 4 4 of Fig. 3. Figs. 5 and 6 are cross-sections of modified forms of tubular tracks. Figs. 7 and 8 are respectively a longitudinal section and a plan of part of a tubular track, the separate sections of which are mounted on vertical pivots. Figs. 9, 10, and 11 are respectively a longitudinal section, a plan, and a cross-section of another form of changeable track. Figs. 12 and 13 are respectively a plan of part and a cross-section of one of the tracks shown in Figs. 9, 10, and 11. Figs. 14 and 15 are respectively a plan of part and a cross-section of a slightly-modified form of track to that shown in Figs. 12 and 13. Figs. 16 and 17 are respectively a plan of part and a cross-section of another form of track. Figs. 18 and 19 are respectively a longitudinal section and a cross-section of part of a track, showing details of the wheels and supports for the horses or other objects; and Figs. 20 and 21 are longitudinal sections of parts of tracks, showing other methods of mounting the horses or other objects. Fig. 22 is a plan of a modified form of track, partly in section.

In carrying the invention into effect I preferably construct the track with a sloping foundation, as shown in Fig. 9, consisting of boards $a$, mounted on tripods $b$, or these latter may be replaced by trestles or adjustable standards. Each of the changeable tracks may consist of a body $c$, which is tubular, as shown in Figs. 1 to 8, such body $c$ having one or more slots $d$ therein from end to end, with flanges $e$ arranged at each side of said slots $d$ to better support the horses or other objects when running.

In Figs. 1, 3, and 4 I show tubular tracks of circular or round cross-section, each provided with two slots $d$, with their flanges $e$. As seen in Figs. 3 and 4, these tracks are provided with pivots $f$ at their ends, which pass through the framework $g$ of the track and are provided with buttons $h$, by means of which they may be turned on said pivots. The track shown in Fig. 5 has also two slots $d$; but it is of rectangular section and is supported on the foundation $a$ by means of strips of wood $i$, having slots $j$ therein to receive the flanges $e$. This form of track would be lifted bodily and turned over by hand, one set of flanges $e$ being placed in the supporting-slots $j$.

In Fig. 6 is shown a form of tubular track having three sets of slots $d$ and flanges $e$. This might be supported by end pivots, as shown in Figs. 3 and 4, or by a foundation fitting the under side thereof.

In Figs. 7 and 8 I have shown tracks having sockets $k$, mounted on vertical pivots $l$, carried by the foundation $a$. Such tracks may be rotated on the pivots, so as to turn them end for end. In Fig. 8 one of the sections of the track is shown in dotted lines partly turned.

It will be noticed that the tracks in Figs. 7 to 10 consist of separate sections placed end to end. Such tracks may be made longer by adding other sections, and all or only some of these sections may be provided with means for moving, and thus changing the character of the tracks when desired.

In some cases in lieu of making the tracks $c$ tubular and with internal running-surfaces I may make them either solid or hollow and with external running-surfaces and may arrange the guiding-slots $d$ at a slight distance above such solid tracks. Such solid tracks $c$ are shown in Figs. 9 to 22 and are also provided with pivots $f$ and buttons $h$, by which they may be turned. Figs. 12 and 13 show a solid track $c$ of circular cross-section. Figs. 14 and 15 show a solid track of square cross-section. Figs. 16, 17, and 21 show a track $c$ of square cross-section having external grooves $m$, in which run the wheels or balls carrying the horses or other objects.

On both interior and exterior tracks I arrange different running-surfaces. In Fig. 12, $n$ represents smooth metal. $o$ represents sandpaper. $p$ represents india-rubber. $q$ represents another kind of surface having cross-lines, and $r$ represents enamel or glass. These varied running-surfaces may be made in any convenient manner and of any suitable material. The speed of the horses will vary according to the character of surface upon which they are moving.

The horses $s$ or other objects are preferably made of metal or are weighted and are provided with vertical supports $t$ on their under sides, to the lower ends of which the supporting wheels or rollers $u$ are pivoted. The wheels or rollers $u$ are of shape adapted to suit the kind of track upon which they are to run. In some cases, Figs. 1, 2, 5, 9, 11, 18, 19, and 21, the horses are supported by pairs of wheels. In Figs. 6 and 20 the horses are supported by single wheels or rollers arranged one in advance of the other. In Fig. 21 the rollers are solid metal or glass balls. The wheels or rollers $u$ are connected to the vertical supports $t$ in any convenient manner, as shown. I preferably employ loose rings $v$, mounted on the supports $t$ in line with the slots $d$ or flanges $e$, so that they will run smoothly and with little friction.

In Figs. 3 and 4 I show one method of placing the wheels and supports for the horses in the tubular tracks. At each end of these tubular tracks I form an opening $w$ large enough to admit the wheels or rollers, which after they are inserted therein are pushed forward into position, with the supports $t$ just within the ends of the slots $d$.

The horses $s$ may be started by means of a starting-gate, (not shown,) which may be raised by hand or in other convenient manner, or each player may start his own horse at a signal. However, in some cases, and especially if the tracks are arranged horizontally, I may employ an arrangement of springs $x$, (see Fig. 22,) connected to a cross-bar $y$, against which all the horses are pressed after the springs have been distended. This cross-bar $y$ may be held in its rearward position by a pin $z$, and when the said pin is withdrawn the cross-bar $y$ will propel all the horses simultaneously.

The tracks may be straight or curved, and the objects may represent cyclists on cycles, motor-cars, ships, &c.

After each race one or more of the tracks is changed in position, and owing to the various running-surfaces, which cannot easily be seen through the slots $d$, it is practically impossible to foresee which horse or other object will win.

What I claim as my invention, and desire to secure by Letters Patent, is—

1. In a race game the combination of a series of separate tracks, different kinds of running-surfaces on different parts of the tracks, and means for changing the position of the separate tracks, substantially as set forth.

2. In a race game the combination of a series of separate tracks, different kinds of running-surfaces on different parts of the tracks, means for changing the position of the separate tracks and objects provided with wheels to run on the tracks, substantially as set forth.

3. In a race game the combination of a series of tracks, different kinds of running-surfaces on different parts of the tracks, means for changing the position of the tracks, slots or flanges arranged above said tracks and objects provided with wheels to run on said running-surfaces and guided by said slots or flanges, substantially as set forth.

4. In a race game, the combination of a series of separate tubular tracks, slots in such tracks, flanges arranged to coöperate with said slots, means for rotating said tubular tracks and different kinds of running-surfaces arranged within said tracks, substantially as set forth.

5. In a race game, the combination of a sloping foundation, separate tracks carried by said foundation, different kinds of running-surfaces at different parts of the tracks, means for changing the positions of the tracks and objects provided with wheels to run on said tracks substantially as set forth.

In testimony whereof I have signed my name to this specification in the presence of two subscribing witnesses.

A. W. McLEOD KEEN.

Witnesses:
 H. SEYMOUR-MILLS,
 CLAUDE K. MILLS.